Patented Mar. 13, 1945

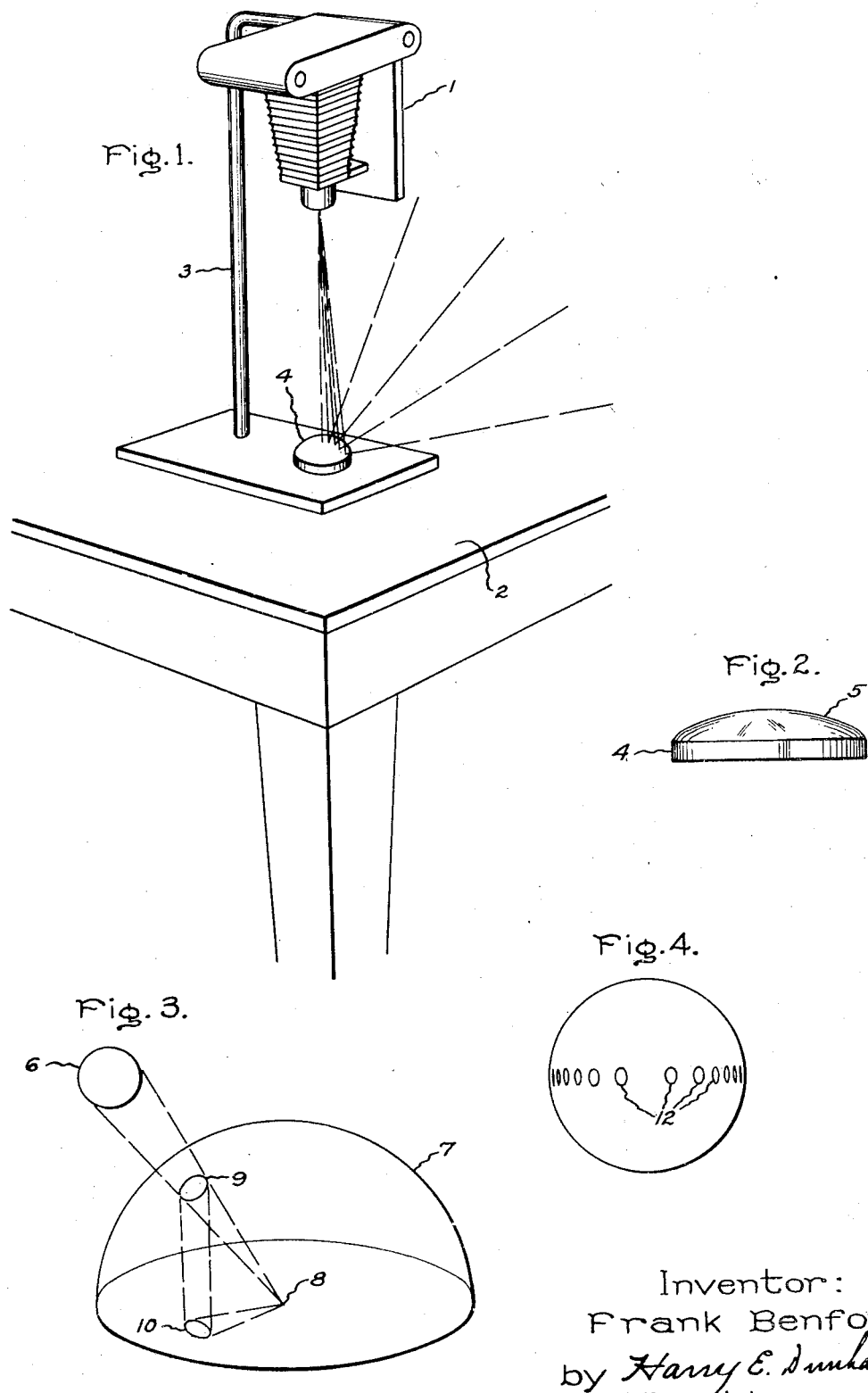

2,371,495

UNITED STATES PATENT OFFICE 2,371,495

APPARATUS EMPLOYED IN COMPUTING ILLUMINATION

Frank Benford, Schenectady, N. Y., assignor to General Electric Company, a corporation of New York Application August 18, 1943, Serial No. 499,076

1 Claim. (Cl. 95—15)

My invention relates to the computation of the illumination in a room where the source of light is extended in area. It is well known that where light enters a room through a window facing a sky of known brightness or where an artificial light source of relatively large area is used the degree of illumination of a surface of reference, such for example as the floor or a work table, varies with the angular height of the window or other illuminant above the surface, the illumination being greatest at large angles and diminishing rapidly as the angle approaches zero. More precisely, the illumination from each element of the illuminant depends upon its angular size as seen from the point illuminated and upon the cosine of the angle between the direction of effective radiation and the normal to the illuminated surface. It is the object of my invention to provide improved apparatus by which a picture may be obtained of the interior of a room, the elements of the picture being purposely shown distorted in accordance with the angular height of the parts they represent above the surface of reference. In such a picture the area representing the source of illumination appears proportional to the degree that the surface or some particular part thereof is illuminated by the source.

My invention will be better understood from the following description taken in connection with the accompanying drawing and its scope will be pointed out in the appended claim.

Referring to the drawing, Fig. 1 is a perspective view of apparatus involving my invention; Fig. 2 is a side view of the mirror forming a part thereof; Fig. 3 is a diagram illustrating the effect of the mirror; and Fig. 4 represents a photograph such as might be obtained with the apparatus comprising my invention.

In Fig. 1 I have shown at 1 a camera which is supported above the surface 2 by the standard 3 and is directed downward toward the mirror 4 on the surface. The mirror has a convex reflecting surface 5 to reflect light into the camera from the ceiling and walls of the room in which the apparatus is located, it being understood that the camera is focussed to produce an image on the camera film of the walls and ceiling with at least a fair degree of sharpness.

An important feature of my invention is the mirror. Preferably it is circular in form and has a flat bottom. Its reflecting surface 5 is a convex surface of revolution, the degree of curvature of which is variable being the least at the middle and the greatest adjacent to the perimeter. For a further explanation of the curvature of the reflecting surface, reference is had to the diagram comprising Fig. 3. Here 6 represents a light source in the form of a sphere and 7 represents a transparent hemisphere of which 8 is the center. That part of the light from the source 6 which illuminates the point 8 marks the zone 9 whose boundary is of course a circle on the surface of the hemisphere. Now if the zone 9 be projected on the base plane of the hemisphere it will mark thereon the ellipse 10 whose length is equal to the diameter of the zone and whose width varies with the inclination of the zone with respect to the base of the hemisphere. From this diagram it will be seen that if the source 6 is directly over the point 8 the projection of the zone 9 on the base is a circle and if the source is moved toward the plane of the base while being maintained at a uniform distance from the center 8 the projection of the zone on the base becomes an ellipse whose width progressively decreases until it becomes substantially zero when the source reaches the plane of the base. The curvature of the reflecting surface of the mirror is such that with apparatus as shown by Fig. 1 should a light source like that represented for example by 6 in Fig. 3 be moved from a position directly over the mirror to one substantially in the plane of the surface 2 while maintained at the same radial distance from the mirror the area of the image of the source produced in the camera would vary in the same manner as would the area of the ellipse 10 due to a corresponding movement of the source in Fig. 3 and has been explained above in connection with that figure. In producing the mirror one must take into consideration the lens of the camera and the distance between it and the mirror. Thereafter the camera should be maintained at the set distance and the focal adjustment of the camera lens should not be varied notwithtsanding the fact that to obtain a desired depth of focus it may be found necessary to stop down the lens to a very small aperture. The effect in the apparatus which I have devised of the pronounced increase in the strength of the curvature of the reflecting surface of the mirror adjacent its periphery is to produce a distortion of those images which lie near the circumference of the picture since the nearer an object is to the plane of the surface of reference 2 the more its image is contracted in a radial direction although unchanged circumferentially.

The result is that the area of an image becomes of zero value at the periphery. In Fig. 4 I have shown a copy of a photograph made with apparatus such as that shown in Fig. 1 wherein successive exposures represented by the images 12 are made as a spherical light source is moved through equal angular increments of a semicircle whose center lies at the intersection of the mirror axis and the plane of the surface 2. It will be observed that certain images of the light source when the latter is directly overhead are obscured by the camera itself. Throughout the central portion of the picture the images are approximately circular in form, have the same diameter and are approximately equally spaced. Toward the periphery of the picture, however, the images become elliptical with a decrease in spacing and while the major axes of the ellipses remain the same, being equal to the diameter of the circular images, the minor axes rapidly decrease until the last image at each end of the row and close to the periphery of the picture appears scarcely more than a line of light.

Inasmuch as in pictures made with apparatus such as I have disclosed the area of the image of a light source is proportional to the amount by which a point in the surface of reference covered by the mirror is illuminated by that source one needs merely to measure the area of such an image to obtain a figure which indicates the illumination value of the light source represented thereby. This follows from the fact that if the area of the ellipse 10 in Fig. 3 is $n$ per cent of the area of the base of the hemisphere 7 then the illumination at 8 in foot candles is $n$ per cent of the surface brightness of 6 in foot lamberts.

What I claim as new and desire to secure by Letters Patent of the United States is:

Apparatus for making a photograph of a room provided with a source of illumination having an extended area, comprising a convex mirror supported on a surface of reference and a camera directed toward said mirror and perpendicularly to said surface, the curvature of said mirror being progressively stronger from the center toward the periphery thereof such that if a sphere source of light be moved around the mirror in a semicircle whose center line lies at the intersection of the surface of reference and the axis of the mirror, the movement of the light source being on the camera side of the mirror and in a plane which includes such axis, the size of the image of the light source as reflected by the mirror to the camera for various positions of said light source is exactly proportional to the amount by which a point in the surface of reference covered by the mirror would be illuminated by such light source if allowed to strike such surface from corresponding positions.

FRANK BENFORD.